(12) United States Patent
Chiang et al.

(10) Patent No.: US 11,164,094 B2
(45) Date of Patent: Nov. 2, 2021

(54) DEVICE, METHOD, AND NON-TRANSITORY COMPUTER READABLE STORAGE MEDIUM FOR LABELLING MOTION DATA

(71) Applicant: Institute For Information Industry, Taipei (TW)

(72) Inventors: Wei-Ming Chiang, New Taipei (TW); Hsien-Cheng Liao, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 417 days.

(21) Appl. No.: 16/248,764

(22) Filed: Jan. 15, 2019

(65) Prior Publication Data

US 2020/0050955 A1    Feb. 13, 2020

(30) Foreign Application Priority Data

Aug. 10, 2018 (TW) ................................ 107128025

(51) Int. Cl.
 *G06N 5/04* (2006.01)
 *G06N 20/00* (2019.01)
(52) U.S. Cl.
 CPC ............. *G06N 5/048* (2013.01); *G06N 20/00* (2019.01)
(58) Field of Classification Search
 None
 See application file for complete search history.

(56) References Cited

U.S. PATENT DOCUMENTS

| 5,807,283 | A  |  | 9/1998 | Ng |
|---|---|---|---|---|
| 2010/0324456 | A1 |  | 12/2010 | Jonsson et al. |
| 2012/0172745 | A1 |  | 7/2012 | Miyazaki et al. |
| 2017/0055918 | A1 | * | 3/2017 | Hughes ............. A63B 24/0003 |

(Continued)

FOREIGN PATENT DOCUMENTS

| TW | 201445493 A | 12/2014 |
|---|---|---|
| TW | 201530478 A | 8/2015 |

OTHER PUBLICATIONS

AALO: Activity recognition in smart homes using Active Learning in the presence of Overlapped activities (Hoque, et al.) taken from https://ieeexplore.ieee.org/document/6240373 (Year: 2012).*

(Continued)

*Primary Examiner* — Alexey Shmatov
*Assistant Examiner* — Hamza R Mughal
(74) *Attorney, Agent, or Firm* — CKC & Partners Co., LLC (57) ABSTRACT

A device, method, and non-transitory computer readable storage medium for labelling motion data are provided. The device receives several motion signals, wherein each motion signal includes a motion time message and a motion data group. A motion script includes a plurality of preset motion messages, wherein each preset motion message includes a preset time message and a preset motion. The device performs the following steps for each preset time message: determining a first subset of the motion signals by comparing the motion time messages with the preset time message, calculating a similarity between the motion data group of each motion signal in the first subset and a reference model, determining a second subset of the first subset based on the first similarities, and labelling the motion data group of each motion signal included in the second subset as correspond- (Continued)

ing to the preset motion corresponding to the preset time message.

15 Claims, 3 Drawing Sheets

(56) References Cited

U.S. PATENT DOCUMENTS

2017/0063475 A1\* 3/2017 Feng ................. A61B 5/7278
2017/0255868 A1\* 9/2017 Gelinas ................ G06N 20/00

OTHER PUBLICATIONS

Office Action to the corresponding Taiwan Patent Application rendered by the Taiwan Intellectual Property Office (TIPO) dated Oct. 31, 2019, 8 pages (including English translation).

\* cited by examiner

DEVICE, METHOD, AND NON-TRANSITORY COMPUTER READABLE STORAGE MEDIUM FOR LABELLING MOTION DATA

PRIORITY

This application claims priority to Taiwan Patent Application No. 107128025 filed on Aug. 10, 2018, which is hereby incorporated by reference in its entirety.

FIELD

The present invention relates to a device, method, and non-transitory computer readable storage medium for labelling motion data. More particularly, the present invention relates to a device, method, and non-transitory computer readable storage medium for labelling motion data that automatically label motion data based on the comparison of a motion script and a reference model.

BACKGROUND

Nowadays, people from many fields have adopted the technology of "machine learning" to establish motion recognition models. To derive a better motion recognition model, conventional machine learning technology requires a huge amount of labelled motion data in the training procedure. However, it is not an easy task to collect a huge amount of motion data and label them. Furthermore, motion data in some application fields is continuous, and collecting and labelling this kind of motion data are even harder. Taking aerobic exercise as an example, if a better motion recognition model trained by machine learning technology is required, motion data of multiple people doing aerobic exercise has to be collected and recorded and each piece of the motion data has to be labelled correctly. This process is not only cumbersome but also time-consuming.

Conventional methods for collecting and labelling motion data can be categorized into two types. The first type of methods operates in the manner of single collection and labelling, which selects a motion to be labeled each time, collects the motion data when a user performs the motion once, and then labels the starting time point and the end time point of the motion data. The collection and labelling can be completed by repeating the process for several times. The second type of methods operates in the manner of batch collection, which selects a motion to be labeled, collects the batch motion data when a user repeats the motion for several times, and then performs some analyses on the batched motion data to drive the possible starting time point and the possible end time point of each motion data. The disadvantages of the aforesaid two types of methods are that the process requires excessive human intervention and the accuracy of the process is not good enough. Therefore, how to efficiently and correctly collect and label motion data required by machine learning is an urgent problem to be solved.

SUMMARY

Provided are a device, method, and non-transitory computer readable storage medium for labelling motion data that automatically label motion data based on the comparison of a motion script and a reference model.

The device for labelling motion data may comprise a receiving interface, a non-transitory computer readable storage medium, and a processor, wherein the processor is electrically connected to the receiving interface and the non-transitory computer readable storage medium. The receiving interface receives a plurality of motion signals, wherein each of the motion signals includes a motion time message and a motion data group. The non-transitory computer readable storage medium stores a motion script, wherein the motion script includes a plurality of preset motion messages, and each of the preset motion messages includes a preset time message and a preset motion. The processor performs the following steps for each of the preset time messages: (a) determining a first subset of the motion signals by comparing the motion time messages with the preset time message, (b) calculating a similarity between the motion data group of each of the motion signals in the first subset and a reference model, (c) determining a second subset of the first subset based on the similarities, wherein the similarity between the motion data group of each of the motion signals included in the second subset and the reference model is greater than a threshold, and (d) labelling the motion data group of each of the motion signals included in the second subset as corresponding to the preset motion corresponding to the preset time message.

The method for labelling motion data can be adapted for an electronic device. The electronic device stores a motion script, wherein the motion script includes a plurality of preset motion messages, and each of the preset motion message includes a preset time message and a preset motion. The method for labelling motion data comprises the following steps: (a) receiving a plurality of motion signals, wherein each of the motion signals includes a motion time message and a motion data group, and (b) performing the following steps for each of the preset time message: (b1) determining a first subset of the motion signals by comparing the motion time messages with the preset time message, (b2) calculating a similarity between the motion data group of each of the motion signals in the first subset and a first reference model, (b3) determining a second subset of the first subset based on the similarities, wherein the similarity between the motion data group of each of the motion signals included in the second subset and the reference model is greater than a first threshold, and (b4) labelling the motion data group of each of the motion signals included in the second subset as corresponding to the preset motion corresponding to the preset time message.

The non-transitory computer readable storage medium can store a group of computer executable programs. When the non-transitory computer readable storage medium is read by a processor, the processor performs the group of computer executable programs to implement the aforementioned method for labelling motion data.

The device, method, and non-transitory computer readable storage medium for labelling motion data disclosed herein can correctly label each piece of motion data without excessive human intervention, reduce the complexity of subsequent data processing, and improve data reliability. Through the device, method, and non-transitory computer readable storage medium for labelling motion data, various kinds of continuous motion data of multiple people may be collected simultaneously and be labelled appropriately and automatically. Hence, the device, method, and non-transitory computer readable storage medium for labelling motion data can accelerate the process of labelling and collecting motion data, automatize the labelling of the motion data, improve the accuracy and usability of the motion data, and increase the identification efficiency of the motion identification model.

Based on the detailed description below, a person having ordinary skill in the art should easily understand the scope of the present invention. However, it should be understood that the following the detailed description and the specific embodiments are merely illustrative, and that is due to base on the detailed description which the person having ordinary skill in the art shall intelligibility various changes and retouches within the spirit and scope of the present invention.

BRIEF DESCRIPTION OF THE DRAWINGS

The present invention shall be more comprehensively understood through the detailed description and the drawings below. However, it should be understood that the drawings are provided by way of illustration only and are not intended to limit the present invention, and wherein.

DETAILED DESCRIPTION

In the following description, the present invention will be explained by referring to the exemplary embodiments of the present invention. However, the exemplary embodiments described hereinafter are not intended to limit the present invention to any specific examples, embodiments, environments, applications, or specific process programs described in these embodiments. Therefore, the exemplary embodiments described hereinafter are only intended to be illustrative instead of limiting, and the scope of the present invention shall be determined by the Claims.

It should be understood that in the following embodiments and drawings, elements unrelated to present invention are omitted and not shown; and the dimensions of individual elements and the dimensions between the individual elements in the drawings are only example for the sake of understanding, but not intended to limit the present invention.

Figure 1A:
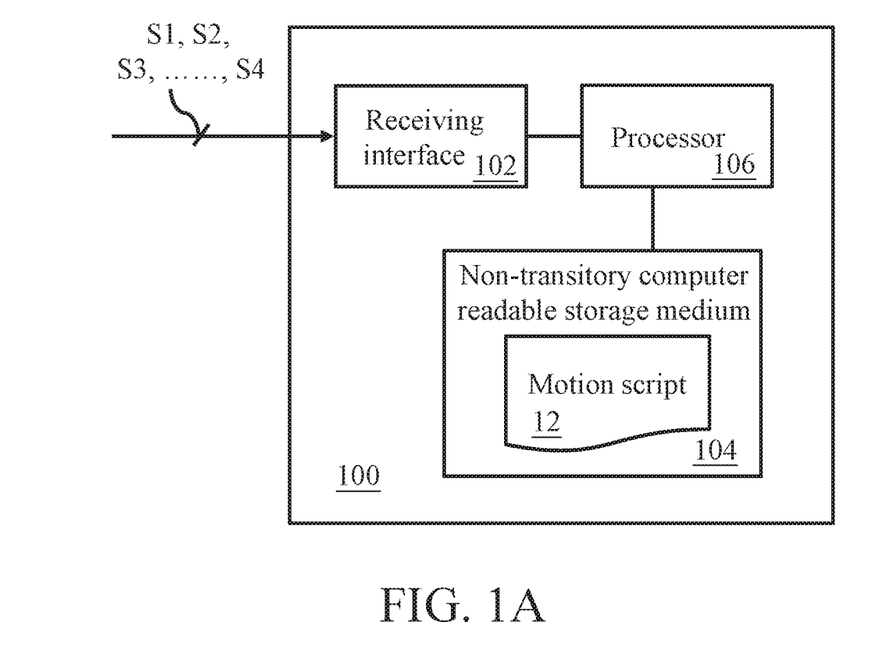
FIG. 1A is a schematic view of the device 100 for labelling motion data based on the present invention.

FIG. 1A is a schematic view of an embodiment of the device 100 for labelling motion data of the present invention. The device 100 for labelling motion data is an electronic device, which may be implemented by a computer, a local server, a cloud server, or a machine combination thereof. The device 100 for labelling motion data includes a receiving interface 102, a non-transitory computer readable storage medium 104, and a processor 106. The processor 106 is electrically connected to the receiving interface 102 and the non-transitory computer readable storage medium 104. In some embodiments, the processor 106 may be physically connected to the receiving interface 102 and the non-transitory computer readable storage medium 104.

The receiving interface 102 may be a signal receiver or other interface capable of receiving digital data. The non-transitory computer readable storage medium 104 may be a memory, a Universal Serial Bus (USB) disk, a hard drive, a Compact Disk (CD), a portable disk drive, or any other non-transitory storage medium, or device having the same function for storing digital data known to a person having ordinary skill in the art. The processor 106 may be various kinds of processors, a Central Processing Unit (CPU), a Microprocessor Unit (MPU), Digital Signal Processor (DSP), or any other computing device having the same function known to person having ordinary skill in the art.

The non-transitory computer readable storage medium 104 stores a motion script 12. The motion script 12 includes a plurality of preset motion messages, wherein each of the preset motion messages includes a preset time message and a preset motion. In this embodiment, each of the preset time messages includes a starting time point and an end time point. In other embodiments, each of the preset time messages may include a starting time point and a length of time. In addition, in the motion script 12, each of the preset motion may be recorded in a code, a text, a symbol, or other means.

Figure 1B:
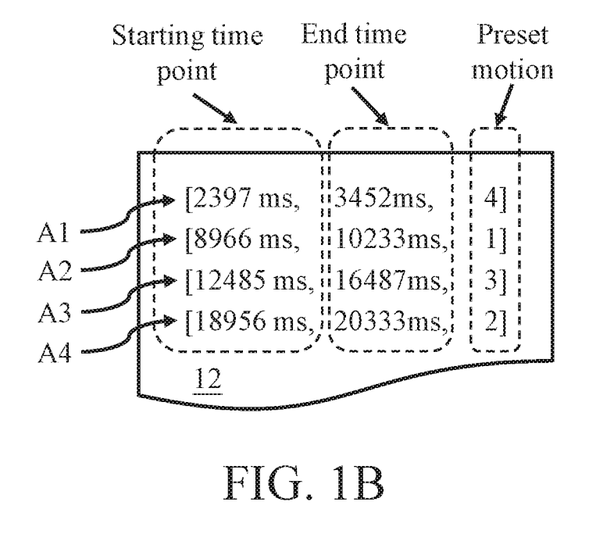
FIG. 1B is a schematic view of a specific example of the motion script 12 of the present invention.

For better understanding of the present invention, a specific example shown in FIG. 1B is described in details, which, however, is not intended to limit the scope of the present invention. In this specific example, the motion script 12 includes four preset motion messages A1, A2, A3, A4, wherein each of the preset motion messages A1, A2, A3, A4 includes a starting time point, an end time point, and a preset motion, and each preset motion is represented by a code. For the convenience of the follow-up description, it is assumed that code 1, 2, 3, 4 represents raising hand, boxing, bending, and kicking, respectively. It should be noted that the present invention does not limit the way to generate the motion script 12. For example, in the application of aerobic exercise, a coach may generate the motion script 12 by defining the time points/durations for performing various preset motions (e.g., raising hand, boxing) based on the beat, rhythm, melody, or other characteristics of the music.

In this embodiment, when one or more users act based on the motion script 12 (e.g., the coach leads the user to exercise based on the motion script 12), the receiving interface 102 receives a plurality of the motion messages S1, S2, S3, . . . , S4 from the user(s) (e.g., received from the inertial measurement sensors worn by the users). Each of the motion messages S1, S2, S3, . . . , S4 includes a motion time message and a motion data group, wherein the motion time message includes one or more time point that an inertial measurement sensor generates the motion data group. Depending on the type of the inertial measurement sensor worn by the user, each of the motion data group may include a plurality of acceleration values, a plurality of angular velocity values, a plurality of quaternion values, a plurality of magnetic values, and a plurality of phase values or a combination thereof.

For example, the motion message S1 may include a first time point, a second time point, and an acceleration value, an angular velocity value, a quaternion value, a magnetic value, or/and a phase value generated between the first time point and the second time point (i.e. a time period) by the inertial measurement sensor worn by a user. In another example, the motion message S2 may include the first time point, the second time point, and another acceleration value, another angular velocity value, another quaternion value, another magnetic value, or/and another phase value generated between the first time point and the second time point (i.e. the time period) by the inertial measurement sensor worn by another user. Similarly, each of the motion messages S3, S4 may include one or more time point and the motion data group corresponding to the one or more time point, which will not be further described herein.

The device 100 for labelling motion data provided by the present invention can determine which motion data group in the motion signals are going to be labelled by comparing the motion time message of the motion signals S1, S2, S3, . . . , S4 and the preset time message as recorded in the motion script 12.

Subsequently, the operation principle of the device 100 for labelling motion data disclosed in the present invention will be specifically explained. The device 100 for labelling motion data performs a method for labelling motion data, whose flowchart is illustrated in the FIG. 2A. As mentioned above, the device 100 for labelling motion data stores a motion script 12, wherein the motion script 12 includes the preset motion messages A1, A2, A3, A4, and each of the preset motion messages A1, A2, A3, A4 includes a preset time message and a preset motion. The method for labelling motion data performed by the device 100 for labelling motion data includes step 201 to step 207, and the details of each step are given below.

Figure 2A:
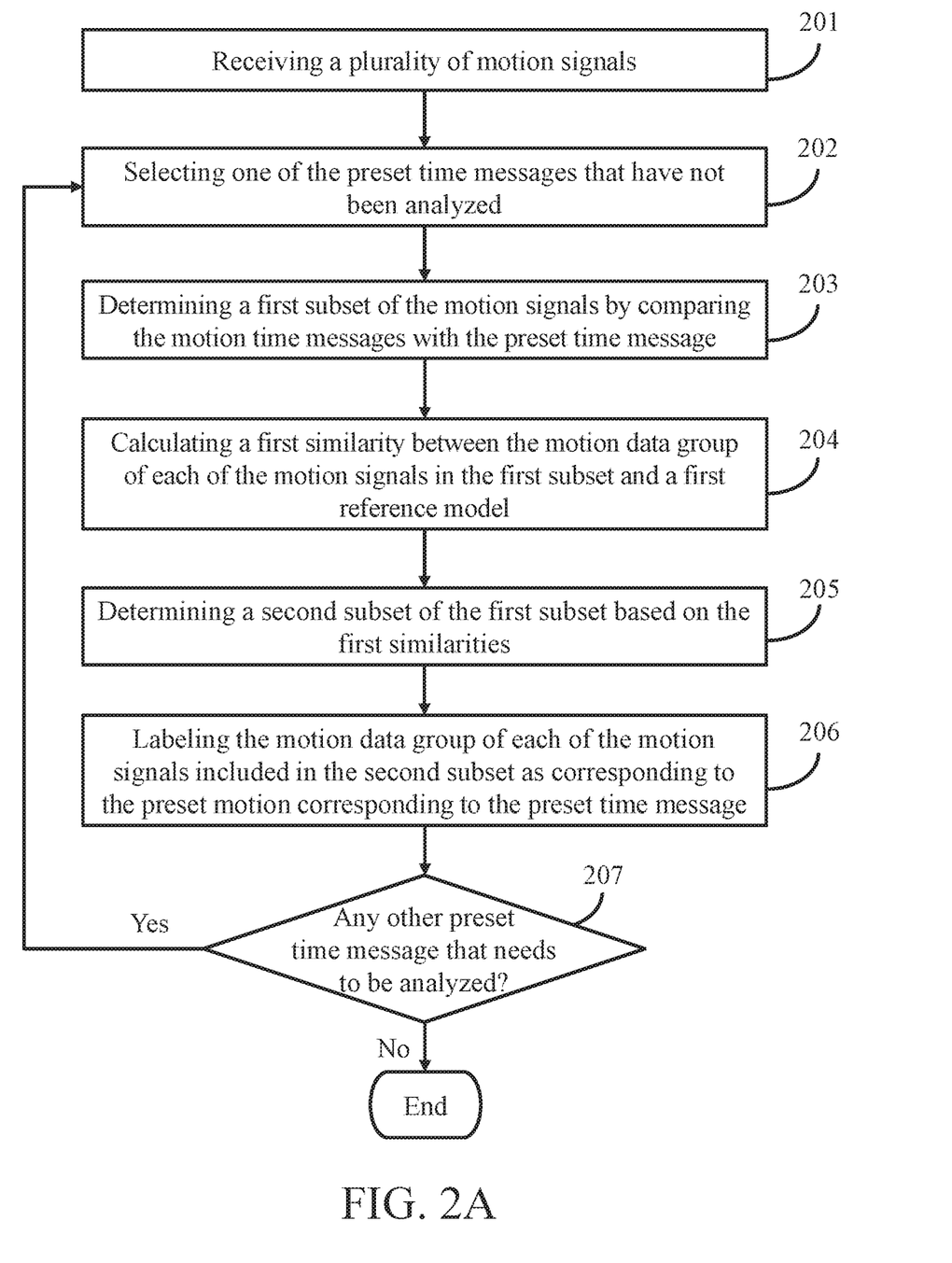
FIG. 2A is a flowchart showing a method of labelling motion data of the present invention.

In step 201, the receiving interface 102 receives a plurality of motion signals S1, S2, S3, . . . , S4, wherein each of the motion signals S1, S2, S3, . . . , S4 includes a preset time message and a preset motion.

The method for labelling motion data performs the step 202 to step 207 for each of the preset time message of the preset motion messages A1, A2, A3, A4.

In step 202, the processor 106 selects one of the preset time messages that have not been analyzed.

In step 203, the processor 106 determines the first subset of the motion signals S1, S2, S3, . . . , S4 by comparing the motion time message of the motion signals S1, S2, S3, . . . , S4 and the preset time message. In this embodiment, if the motion time message of a motion signal falls within the preset time message, the motion signal will be selected into the first subset. In other embodiment, if the motion time message of a motion signal falls within the preset time message, or the time difference between the motion time message of a motion signal and the preset time message is within a preset range, the motion signal will be selected into the first subset. For the convenience of follow-up instructions, it is assumed that the motion signal S1, the motion signal S2, and the motion signal S3 are determined as forming the first subset by the processor 106 after the processor 106 analyzes the preset time message of the preset motion message A1 according to the step 203.

In step 204, the processor 106 calculates a first similarity between the motion data group of each of the motion signals in the first subset and a first reference model, wherein the first reference model corresponds to the preset motion corresponding to the preset time message. For better understanding, it is assumed that the processor 106 currently analyzes the preset time message of the preset motion message A1, and the preset motion corresponding to the preset time message is the preset motion corresponding to the code 4 (i.e., kicking). Therefore, the first reference model corresponds to the preset motion corresponding to code 4.

In some embodiments of the present invention, the first reference model may be a standard model. In these embodiments, the processor 106 will train the first reference model by a plurality of standard motion data groups in advance. For example, a plurality of standard motion signals are generated when one or more coaches act based on the motion script 12 (note that each standard motion signal includes a standard motion time message and a plurality of group of standard motion data), and the first reference model is trained based on the standard motion data group corresponding to the standard motion time message corresponding to the preset time message. It is assumed that the standard motion data group includes an angular velocity value and an acceleration value (not limited to this) and, hence, the first reference model may include a standard angular velocity value and a standard acceleration value.

In some embodiments of the present invention, the first reference model may be a cross-comparison model. In these embodiments, the processor 106 adopts a statistical value (e.g., average value) of the at least one motion data group of the first subset corresponding to the preset time message as the first reference model corresponding to the preset time message. It is assumed that the motion data group includes an angular velocity value and an acceleration value (not limited to this). Under this assumption, the cross-comparison model may include the statistical value (e.g., average value) of the angular velocity value in the first subset and the statistical value (e.g., average value) of the acceleration value in the first subset (e.g., average value).

It should be noted that the step 204 may calculate each of the first similarities by utilizing various statistical values or methods of machine learning (e.g., extremum, average value, standard deviation, variance, root mean square, distribution interval, dynamic time warping, K-means, decision tree). These methods for calculating similarity are well known to a person having ordinary skill in the art, so the details of them are not described herein.

In step 205, the processor 106 determines a second subset of the first subset based on the first similarities, wherein the first similarity between the motion data group of each of the motion signals included in the second subset and the first reference model is greater than a first threshold. In other words, the step 205 selects the motions signal(s) whose motion data group is close enough to the first reference model from the first subset as the second subset. For example, the first subset includes the motion signal S1, the motion signal S2, and the motion signals S3, the processor 106 determines that the first similarity between the motion data group of the motion signal S1 and the first reference model is greater than a first threshold and the first similarity between the motion data group of the motion signal S2 and the first reference model is also greater than the first threshold. Therefore, the motion signal S1 and the motion signal S2 are regarded as the second subset.

It should be described that, in some embodiments of the present invention, the first threshold may be a specific ratio or a specific value. For example, if the content of the first reference model is an angular velocity value of 10 rad/s and the content of the motion data group of some motion signal is an angular velocity value of 9 rad/s, the step 204 may calculate the first similarity based on a standard deviation formula $$\left( i.e., \frac{\left( \begin{array}{c} \text{standard angular velocity value} - \\ \text{angular velocity value of motion signal} \end{array} \right)}{\text{standard angular velocity value}} \right)$$

and then the step 205 further determines whether the first similarity is greater than 5%.

It should be noted that, in some embodiments, the steps 204 and 205 performed by the processor 106 take more than one single factor in to consideration (i.e., a motion data group includes a variety of inertial measurement data, such as having both the acceleration value and angular velocity value). In these embodiments, the processor 106 performs a comprehensive determination. For example, each of the factors corresponds to a sub-threshold. If the similarity of a certain factor is greater than its corresponding sub-threshold but the similarity of another factor is not greater than its corresponding sub-threshold, the processor 106 determines that the first similarity of the motion signal is less than the first threshold and will not select the motion signal into the second subset.

In step 206, the processor 106 labels the motion data group of each of the motion signals included in the second subset as corresponding to the preset motion corresponding to the preset time message. It is assumed that the processor 106 currently analyzes the preset time message of the preset motion message A1 and the second subset includes the motion signal S1 and the motion signal S2, the processor 106 labels the motion data group of the motion signal S1 and the motion data group of the motion signal S2 as corresponding to the preset motion (i.e., kicking) corresponding to the preset time message.

In step 207, the processor 106 determines whether any other preset time messages needs to be analyzed. If the result of the determination is yes, step 202 to step 207 are performed again. If the result of the determination is no, the analysis of the preset time message is ended.

In some embodiments, the processor 106 may perform an additional step after the step 207 determines that there is no other preset time message to be analyzed. More particularly, in the additional step, the processor 106 trains a preset motion model for each of the preset motions according to the corresponding motion data group.

According to the above description, the device 100 for labelling motion data and the method for labelling motion data can derive the motion data group corresponding to each preset time message (i.e. the first subset) by comparing the motion time message of the motion signal S1, S2, S3, . . . , S4 and the preset time message of the motion script 12, and derive the motion data group for training the preset action model of a preset action (i.e. the second subset) by comparing with the first reference model. Through the aforesaid steps, the device 100 for labelling motion data and the method for labelling motion data can accurately label the motion data group, select the motion data group suitable for training the preset motion model, and overcome the problem of manually labelling of the prior art.

Figure 2B:
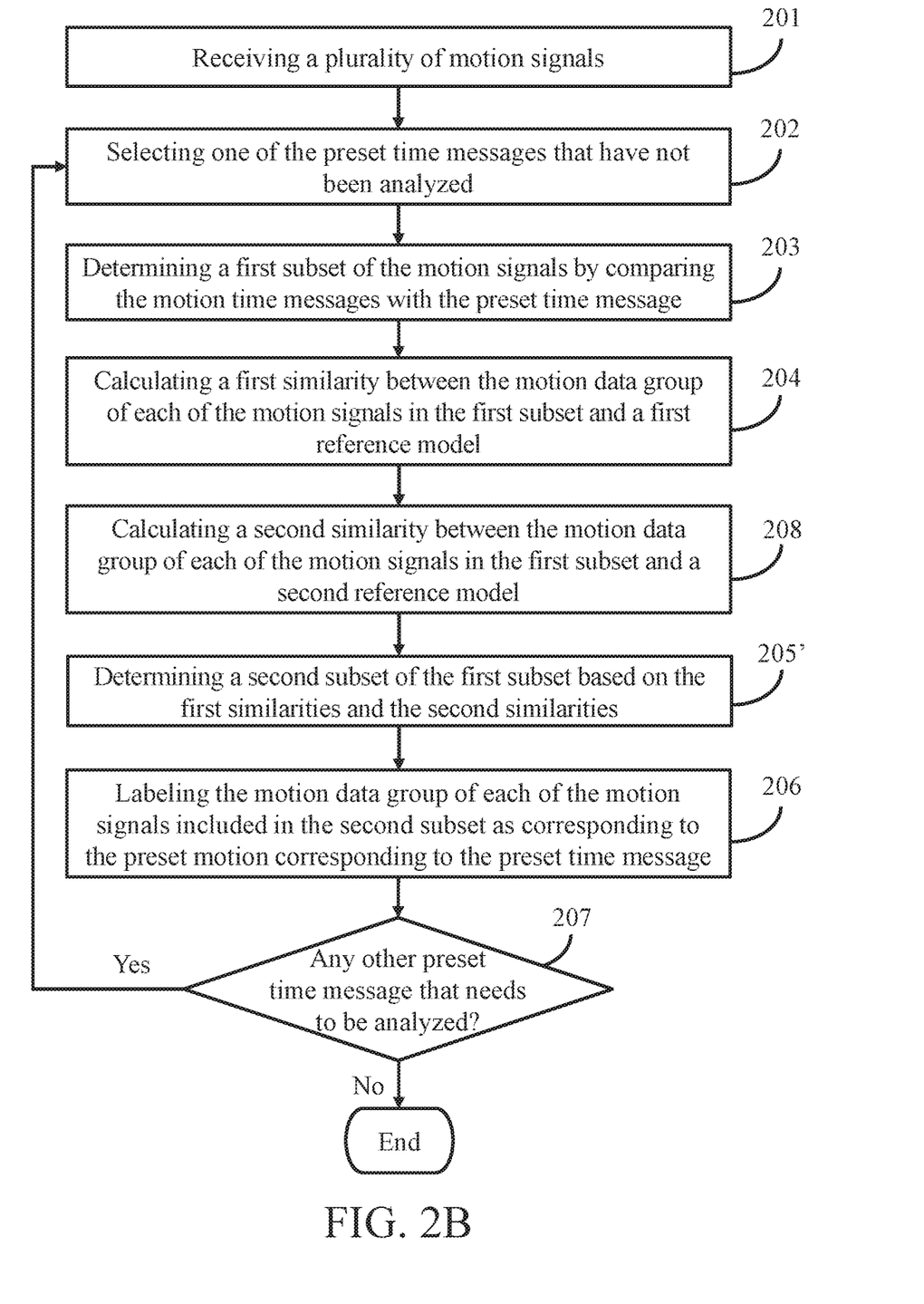
FIG. 2B is a flowchart showing another method of labelling motion data of the present invention.

It should be noted that in some embodiments of the present invention, the flowchart of the method for labelling motion data performed by the device 100 for labelling motion data is as shown in FIG. 2B. The flowchart in FIG. 2B is similar to the flowchart shown in FIG. 2A, so the following description will be focus on the differences between them.

In these embodiments, the processor 106 performs step 208 after performing the step 204. In step 208, the processor 106 calculates a second similarity between the motion data group of each of the motion signals in the first subset and a second reference model. In an embodiment of the present invention, the first reference model may be the aforementioned standard model, and the second reference model may be the aforementioned cross-comparison model (alternatively, the first reference model may be the aforementioned cross-comparison model, and the second reference model may be the aforementioned standard model), but not limited to this.

In these embodiments, the processor 106 executes step 205' instead of step 205 after executing step 208. In step 205', the processor 106 determines the second subset based on the first similarities and the second similarities, wherein the first similarity between the motion data group of each of the motion signals included in the second subset and the first reference model is greater than the first threshold and the second similarity between the motion data group of each of the motion signals included in the second subset and the second reference model is greater than a second threshold. Step 206 is performed after step 205'.

Comparing with the method for labelling motion data shown in FIG. 2A, the method for labelling motion data shown in FIG. 2B performs additional determination on the motion data group in the motion signal and, thereby, enhancing the accuracy of the motion data labelling.

Another embodiment of the present invention is a non-transitory computer readable storage medium. The non-transitory computer readable storage medium may be an electronic product, such as a Read Only Memory (ROM), a flash memory, floppy disk, a hard drive, a Compact Disk (CD), a portable disk drive, a database accessible by network, or any other non-transitory storage medium or device having the same function for storing digital data known to a person having ordinary skill in the art. The non-transitory computer readable storage medium stores a group of computer executable programs. When the non-transitory computer readable storage medium is read by a processor, the processor performs the group of computer executable programs to implement the foregoing various methods for labelling motion data.

The device, method, and non-transitory computer readable storage medium for labelling motion data disclosed by the present invention can correctly label each piece of motion data without excessive human intervention, reduce the complexity of subsequent data processing, and improve data reliability. Through the device, method, and non-transitory computer readable storage medium for labelling motion data of the present invention, various kinds of continuous motion data of multiple people may be collected simultaneously and be labelled appropriately and automatically. In view of the above descriptions, the device, method, and non-transitory computer readable storage medium for labelling motion data of the present invention can accelerate the process of labelling and collecting motion data, automatize the labelling of the motion data, improve the accuracy and usability of the motion data, and increase the identification efficiency of the motion identification model.

The above disclosure is only utilized to enumerate partial embodiments of the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device for labelling motion data, comprising:
   a receiving interface, being configured to receive a plurality of motion signals, wherein each of the motion signals includes a motion time message and a motion data group;
   a non-transitory computer readable storage medium, being configured to store a motion script, wherein the motion script includes a plurality of preset motion messages, each of the preset motion messages includes a preset time message and a preset motion; and
   a processor, being electrically connected to the receiving interface and the non-transitory computer readable storage medium and performs the following steps for each of the preset time messages:
      determining a first subset of the motion signals by comparing the motion time messages with the preset time message;

calculating a first similarity between the motion data group of each of the motion signals in the first subset and a first reference model;

calculating a second similarity between the motion data group of each of the motion signals in the first subset and a second reference model;

determining a second subset of the first subset based on the first similarities and the second similarities, wherein the first similarity between the motion data group of each of the motion signals included in the second subset and the first reference model is greater than a first threshold and the second similarity between the motion data group of each of the motion signals included in the second subset and the second reference model is greater than a second threshold; and labelling the motion data group of each of the motion signals included in the second subset as corresponding to the preset motion corresponding to the preset time message, and wherein the processor further performs the following step for each of the preset motions:

training a preset motion model by the at least one motion data group corresponding to the preset motion.

2. The device for labelling motion data of claim 1, wherein the processor further trains the first reference model by utilizing a plurality of standard motion data groups.

3. The device for labelling motion data of claim 1, wherein the processor further takes a statistical value of the at least one motion data group of the first subset corresponding to each of the preset time messages as the first reference model corresponding to each of the preset time messages.

4. The device for labelling motion data of claim 1, wherein the processor further trains the first reference model by utilizing a plurality of standard motion data groups and the processor further takes a statistical value of the motion data group of each of the motion signals included in the first subset corresponding to each of the preset time messages as the second reference model corresponding to each of the preset time messages.

5. The device for labelling motion data of claim 1, wherein the processor calculates the first similarity between a first statistical value of the motion data group of each of the motion signals in the first subset and a second statistical value of the first reference model.

6. The device for labelling motion data of claim 1, wherein each of the motion data groups includes at least one of a plurality of acceleration values, a plurality of angular velocity values, a plurality of quaternion values, a plurality of magnetic values, and a plurality of phase values.

7. A method for labelling motion data, being adapted for an electronic device, the electronic device storing a motion script, the motion script including a plurality of preset motion messages, each of the preset motion messages including a preset time message and a preset motion, and the method for labelling motion data comprising:

(a) receiving a plurality of motion signals, wherein each of the motion signals includes a motion time message and a motion data group;

(b) performing the following steps for each of the preset time messages:

(b1) determining a first subset of the motion signals by comparing the motion time messages with the preset time message;

(b2) calculating a first similarity between the motion data group of each of the motion signals in the first subset and a first reference model;

(b3) calculating a second similarity between the motion data group of each of the motion signals in the first subset and a second reference model;

(b4) determining a second subset of the first subset based on the first similarities and the second similarities, wherein the first similarity between the motion data group of each of the motion signals included in the second subset and the first reference model is greater than a first threshold and the second similarity between the motion data group of each of the motion signals included in the second subset and the second reference model is greater than a second threshold; and (b5) labelling the motion data group of each of the motion signals included in the second subset as corresponding to the preset motion corresponding to the preset time message; and (c) performing the following step for each of the preset motions:

training a preset motion model by the at least one motion data group corresponding to the preset motion.

8. The method for labelling motion data of claim 7, further comprising:

training the first reference model by utilizing a plurality of standard motion data groups.

9. The method for labelling motion data of claim 7, further comprising:

taking a statistical value of the at least one motion data group of the first subset corresponding to each of the preset time messages as the first reference model corresponding to each of the preset time messages.

10. The method for labelling motion data of claim 7, further comprising: training the first reference model by utilizing a plurality of standard motion data groups; and taking a statistical value of the motion data group of each of the motion signals included in the first subset corresponding to each of the preset time messages as the second reference model corresponding to each of the preset time messages.

11. The method for labelling motion data of claim 7, wherein the step (b2) calculates the first similarity between a first statistical value of the motion data group of each of the motion signals in the first subset and a second statistical value of the first reference model.

12. The method for labelling motion data of claim 7, wherein each of the motion data groups includes at least one of a plurality of acceleration values, a plurality of angular velocity values, a plurality of quaternions, a plurality of magnetic values, and a plurality of phase values.

13. A non-transitory computer readable storage medium, being configured to store a group of computer executable programs, when the non-transitory computer readable storage medium is read by a processor, the processor performs the group of computer executable programs to implement a method for labelling motion data, an electronic device storing a motion script, the motion script including a plurality of preset motion messages, each of the preset motion messages including a preset time message and a preset motion, and the method for labelling motion data comprising:

(a) receiving a plurality of motion signals, wherein each of the motion signals includes a motion time message and a motion data group;

(b) performing the following steps for each of the preset time messages:
- (b1) determining a first subset of the motion signals by comparing the motion time messages with the preset time message;
- (b2) calculating a first similarity between the motion data group of each of the motion signals in the first subset and a first reference model;
- (b3) calculating a second similarity between the motion data group of each of the motion signals in the first subset and a second reference model;
- (b4) determining a second subset of the first subset based on the first similarities and the second similarities, wherein the first similarity between the motion data group of each of the motion signals included in the second subset and the first reference model is greater than a first threshold and the second similarity between the motion data group of each of the motion signals included in the second subset and the second reference model is greater than a second threshold; and
- (b4) labelling the motion data group of each of the motion signals included in the second subset as corresponding to the preset motion corresponding to the preset time message; and (c) performing the following step for each of the preset motions:
  training a preset motion model by the at least one motion data group corresponding to the preset motion.

14. The non-transitory computer readable storage medium of claim 13, wherein the method for labelling motion data further comprises:
  training the first reference model by utilizing a plurality of standard motion data groups.

15. The non-transitory computer readable storage medium of claim 13, wherein the method for labelling motion data further comprises:
  taking a statistical value of the at least one motion data group of the first subset corresponding to each of the preset time messages as the first reference model corresponding to each of the preset time messages.

* * * * *